US012630449B2

(12) United States Patent
Choi et al.

(10) Patent No.: US 12,630,449 B2
(45) Date of Patent: May 19, 2026

(54) PRUSSIAN BLUE-BASED COAGULANT AND MICROPLASTIC COAGULATION METHOD USING THE SAME

(71) Applicant: KOREA INSTITUTE OF SCIENCE AND TECHNOLOGY, Seoul (KR)

(72) Inventors: Jae Woo Choi, Seoul (KR); Kyung-Won Jung, Seoul (KR); Jee Hye Byun, Seoul (KR); Youngkyun Jung, Seoul (KR); Boram Yang, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 351 days.

(21) Appl. No.: 18/331,396

(22) Filed: Jun. 8, 2023

(65) Prior Publication Data

US 2024/0174535 A1      May 30, 2024

(30) Foreign Application Priority Data

Nov. 24, 2022      (KR) ......................... 10-2022-0159218

(51) Int. Cl.
| | |
|---|---|
| *C02F 1/52* | (2023.01) |
| *C01C 3/12* | (2006.01) |
| *C02F 1/30* | (2023.01) |
| *C02F 3/12* | (2023.01) |
| *C02F 101/30* | (2006.01) |
| *C02F 101/38* | (2006.01) |

(52) U.S. Cl.
CPC .............. *C02F 1/5236* (2013.01); *C01C 3/12* (2013.01); *C02F 1/30* (2013.01); *C02F 2101/30* (2013.01); *C02F 2101/38* (2013.01)

(58) Field of Classification Search
CPC ...... C02F 1/5236; C02F 1/30; C02F 2101/30; C02F 2101/38; C01C 3/12
USPC .................................................. 210/702, 709
See application file for complete search history.

(56) References Cited

FOREIGN PATENT DOCUMENTS

| | | | | |
|---|---|---|---|---|
| CN | 111825241 A | * | 10/2020 | ............... C02F 9/00 |
| JP | 6094597 B2 | * | 11/1994 | |
| JP | 2019152525 A | * | 9/2019 | |
| JP | 6931752 B2 | * | 9/2021 | |
| KR | 10-2017-0090023 A | | 8/2017 | |
| KR | 10-2022-0125409 A | | 9/2022 | |
| KR | 10-2022-0135018 A | | 10/2022 | |
| KR | 10-2022-0141198 A | | 10/2022 | |
| KR | 10-2454143 B1 | | 10/2022 | |
| WO | WO-2020169595 A1 | * | 8/2020 | ............ C02F 1/5209 |

OTHER PUBLICATIONS

Machine-generated English translation of JP 6931752, generated on Oct. 3, 2025.*

(Continued)

*Primary Examiner* — Fred Prince

(57) ABSTRACT

The present disclosure relates to a Prussian blue-based coagulant and a microplastic coagulation method using the same, which may effectively coagulate microplastics having a size of less than 20 μm or nanoplastics and implement an environmentally harmless coagulation process, and the Prussian blue-based coagulant according to the present disclosure refers to Prussian blue being used as a coagulant for microplastics present in a water-system environment.

4 Claims, 11 Drawing Sheets

(56) References Cited

OTHER PUBLICATIONS

Machine-generated English translation of JP 2019152525, generated on Oct. 3, 2025.*

Machine-generated English translation of JP 6094597, generated on Oct. 3, 2025.*

Machine-generated English translation of CN 111825241, generated on Oct. 3, 2025.*

Yujian Zhang et al., "Enhanced removal of polyethylene terephthalate microplastics through polyaluminum chloride coagulation with three typical coagulant aids", Science of the Total Environment, 2021, vol. 800(2021) No. 149589.

Yanyan Gong et al., "Aggregation of carboxyl-modified polystyrene nanoplastics in water with aluminum chloride: Structural characterization and theoretical calculation",Water Research, Nov. 2021, vol. 208(2022) No. 117884.

Sang-Heon Na et al., "Microplastic removal in conventional drinking water treatment processes: Performance, Mechanism, and potential risk", Water Research, Jul. 2021, vol. 202, No. 117417.

Guanyu Zhou et al., "Removal of polystyrene and polyethylene microplastics using PAC and FeCl3 coagulation: Performance and mechanism", Science of the Total Environment, 2021, vol. 752, No. 141837.

Kuok Ho Daniel Tang et al., "Microplastics removal through water treatment plants: Its feasibility, efficiency, future prospects and enhancement by proper waste management", Environmental Challenges, 2021, vol. 5, No. 100264.

Zhijie Chen et al., "Removal of microplastics and nanoplastics from urban waters: Separation and degradation", Water Research, Jul. 2022, vol. 221, No. 118820.

Office Patent Decision for Korean Patent Application No. 10-2022-0159218, dated Mar. 4, 2026.

* cited by examiner

PRUSSIAN BLUE-BASED COAGULANT AND MICROPLASTIC COAGULATION METHOD USING THE SAME

DESCRIPTION OF GOVERNMENT-SPONSORED RESEARCH

This research was supported by the Ministry of Science and ICT of the Republic of Korea under the auspices of the Korea Institute of Science and Technology, the name of the research business is research operation cost support (main project cost) of the Korea Institute of Science and Technology, and the name of the research project is Development of Convergence Innovation Technology for Climate Disaster Response (Project Identification Number: 1711173309).

CROSS REFERENCE TO RELATED APPLICATION

This application claims the priority of Korean Patent Application No. 10-2022-0159218 filed on Nov. 24, 2022, in the Korean Intellectual Property Office, the disclosure of which is incorporated herein by reference.

BACKGROUND OF THE INVENTION

Field of the Invention

The present disclosure relates to a Prussian blue-based coagulant and a microplastic coagulation method using the same, and more particularly, to a Prussian blue-based coagulant and a microplastic coagulation method using the same, which may effectively coagulate microplastics having a size of less than 20 μm or nanoplastics and implement an environmentally harmless coagulation process.

Description of the Related Art

Plastics introduced (flowed) into water systems are broken into small pieces by physical and chemical factors, and plastics having a size of 5 mm or less are generally referred to as microplastics. Among them, microplastics having a size of 5 μm or less are bonded and interact with organisms, and recently, it has been reported that microplastics penetrate into the human body through cell membranes as well as ingestion.

Meanwhile, a research result has been reported that microplastics having a size of 20 μm or more may be removed by 99% or more by utilizing a water treatment process of a water purification plant currently in operation (see Non-patent Document 5). Therefore, a method of removing microplastics having a size of less than 20 μm by applying a coagulation process to the microplastics may be considered, but existing microplastic coagulants are water-soluble Fe and Al-based coagulants (see Non-patent Documents 1, 3, and 4) that remain in water, pollute the environment, and cause severe toxicity to the human body, and a separate treatment process is required to remove the remaining coagulants.

SUMMARY OF THE INVENTION

An object of the present disclosure is to provide a Prussian blue-based coagulant and a microplastic coagulation method using the same, which may effectively coagulate microplastics having a size of less than 20 μm or nanoplastics and implement an environmentally harmless coagulation process.

A Prussian blue-based coagulant according to the present disclosure to accomplish the above object refers to Prussian blue being used as a coagulant for microplastics present in a water-system environment.

In addition, a Prussian blue-based coagulant according to the present disclosure refers to a Prussian blue analogue being used as a coagulant for microplastics present in a water-system environment, wherein a chemical formula of the Prussian blue analogue is $Me^1Me^2(CN_6)$ (wherein $Me^1$ and $Me^2$ are different transition metals).

A microplastic coagulation method using a Prussian blue-based coagulant according to the present disclosure includes coagulating microplastics present in a water-system environment by using Prussian blue under visible-light irradiation.

In addition, a microplastic coagulation method using a Prussian blue-based coagulant according to the present disclosure includes coagulating microplastics present in a water-system environment by using a Prussian blue analogue under visible-light irradiation, wherein a chemical formula of the Prussian blue analogue is $Me^1Me^2(CN_6)$ (wherein $Me^1$ and $Me^2$ are different transition metals).

A pH of the water-system environment where the microplastics are present is neutral or alkaline.

Advantageous Effect

A Prussian blue-based coagulant and a microplastic coagulation method using the same according to the present disclosure have the following effects.

An environmentally harmless microplastic coagulation process can be implemented, and coagulation efficiency is far superior to a microplastic coagulation method using a coagulant of the related art.

In the case of the microplastic coagulation method using the coagulant of the related art, not only does toxic coagulants remain, but pH adjustment is essential for coagulation efficiency, whereas the present disclosure can implement an environmentally harmless microplastic coagulation process in that Prussian blue, which has a toxicity level that is harmless to the human body, is used and recovery of residues is easy. In addition, compared to the microplastic coagulation method using the coagulant of the related art, coagulation efficiency is improved by a factor of at least 4.65 and not more than 237.3.

DETAILED DESCRIPTION OF THE INVENTION

Figure 1:
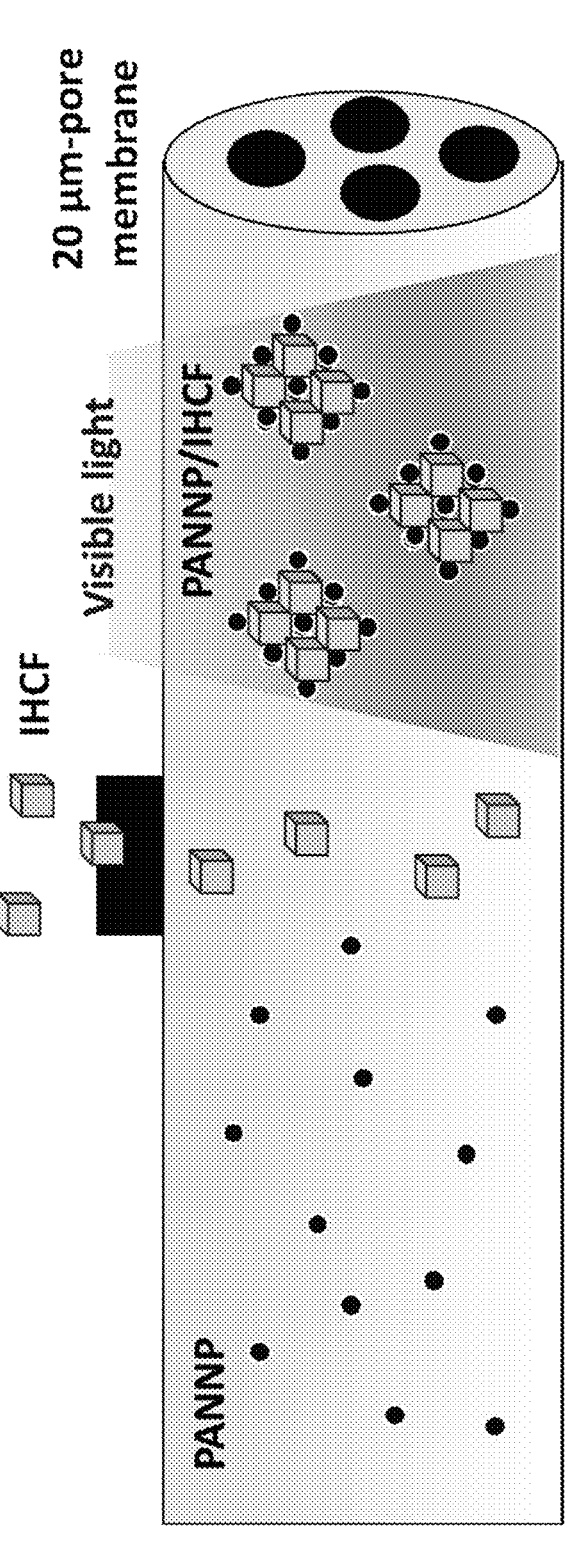
FIG. 1 is a schematic diagram illustrating a process where microplastics are coagulated by Prussian blue.

The present disclosure proposes a technique for coagulating microplastics present in a water system by using Prussian blue ($Fe_4[Fe(CN)_6]_3$) as a coagulant.

Prussian blue is widely used as a pigment and is also used to adsorb cesium, which is a radioactive element, due to its selective adsorption characteristics for cations. In addition, research is also being conducted to utilize Prussian blue in fuel cells and medical fields.

The present disclosure relates to a new use of Prussian blue. The present applicant has confirmed a phenomenon where microplastics present in a water system are coagulated by Prussian blue in an environment where visible light is irradiated, and has analyzed microplastic coagulation characteristics by Prussian blue under various experimental conditions.

A mechanism of a microplastic coagulation phenomenon by Prussian blue has not been clearly identified, but is less related to selective adsorption characteristics for cations, such as cesium adsorption. In an experimental example of the present disclosure, it was confirmed that both microplastics and Prussian blue had a negative surface charge, and in another experimental example, it was confirmed that microplastic coagulation efficiency in a water-system environment with cations was improved compared to an environment without cations. Results of these experimental examples indicate that microplastic coagulation by Prussian blue is not a mechanism based on cation adsorption characteristics such as cesium adsorption.

The present applicant presumes that a microplastic coagulation phenomenon by Prussian blue is closely related to intervalence charge transfer (IVCT) characteristics (hereinafter, referred to as IVCT characteristics) of Prussian blue, based on another experimental example.

IVCT characteristics refer to a charge transfer band of mixed valence compounds, and metal-to-metal charge transfer due to IVCT characteristics in the visible or near-infrared region causes an intense absorption in the electromagnetic spectrum.

The intense blue color of Prussian blue is a consequence of IVCT characteristics of Prussian blue. In other words, metal-to-metal charge transfer occurs due to IVCT characteristics of Prussian blue under a visible-light irradiation environment, thus causing an intense absorption in the electromagnetic spectrum, such that Prussian blue has an intense blue color.

The reason for presuming that a microplastic coagulation phenomenon by Prussian blue is closely related to IVCT characteristics of Prussian blue is based on an XRD analysis result for each of Prussian blue and microplastics bonded with microplastics under a visible-light irradiation environment and an FTIR analysis result for each of Prussian blue and microplastics bonded with microplastics.

As described above, in a visible-light irradiation environment, Prussian blue has an unstable material structure due to IVCT characteristics, but according to the XRD analysis result described below, the microplastics bonded with microplastics have a stable crystalline structure. In addition, according to the FTIR analysis result, compared to microplastics, a new peak is observed in the microplastic bonded with microplastics, indicating that Prussian blue and microplastics are bonded by a chemical interaction rather than physical bonding.

To sum up, it is presumed that Prussian blue, which has an unstable crystalline structure due to IVCT characteristics in a visible-light irradiation environment, is converted into a stable state by bonding with microplastics through a chemical interaction, and it is determined that this mechanism causes a microplastic coagulation phenomenon by Prussian blue.

Furthermore, according to an experimental example described below, it was found that the smaller the size of microplastics was, the higher the coagulation efficiency was. In other words, the coagulation efficiency of microplastics having a size of 1 μm was 385 mg/g, whereas the coagulation efficiency of microplastics having a size of 0.1 μm was 500 mg/g, and according to this result, it is presumed that the smaller the size of microplastics, the more electrochemically unstable they are, resulting in an increase in bonding force with Prussian blue.

In addition, though an experimental example described below, it was confirmed that microplastics having a size of 5 μm or less could be coagulated into a microplastic aggregate having a size of 20 μm or more, indicating that when a microplastic coagulation process by Prussian blue is applied to a general water treatment process, microplastics having a size of less than 20 μm may be easily removed.

The present disclosure is characterized in coagulating microplastics present in a water system by using Prussian blue as a coagulant, wherein the coagulant may be extended to be a Prussian blue analogue (PBA). The PBA is a structure formed by linking two types of transition metals to each other through a coordinate bond with a cyanide ligand, and is represented by a chemical formula, $Me^1Me^2(CN_6)$ (wherein $Me^1$ and $Me^2$ are different transition metals). In the present disclosure, in addition to Prussian blue as a coagulant, the reason why the coagulant may be extended to be a PBA is that the PBA also has the same IVCT characteristics as Prussian blue. Accordingly, in the present specification, the Prussian blue-based coagulant refers to Prussian blue or a PBA.

Meanwhile, referring to an experimental example described below, as a result of examining the effect of pH on the microplastic coagulation efficiency by Prussian blue, it was observed that the closer the pH was to neutral, the higher the microplastic coagulation efficiency was, and the more acidic the pH was, the lower the microplastic coagulation efficiency was. This result indicates that a microplastic coagulation process using Prussian blue may be more effectively applied to river water, waste water, or the like having neutral pH characteristics.

Hereinafter, the present disclosure is described in more detail through Experimental Examples.

Experimental Example 1: Microplastic Coagulation by Prussian Blue

Polyacrylonitrile (PAN) nanoparticles were input to water at a concentration of 1,000 ppm, followed by irradiation of ultrasonic waves thereto for 30 minutes to disperse the PAN nanoparticles. Next. 200 ppm of iron hexacyanoferrate (IHCF) (Prussian blue, $Fe_4[Fe(CN)_6]_3$) was input to the solution in which the PAN nanoparticles were dispersed, followed by being stirred, under the condition of irradiation with general fluorescent lamp light, for 5 minutes at a stirring speed of 200 rpm and then 30 minutes at a stirring speed of 80 rpm, and then being left for 12 hours.

The solution thus left was permeated through a separation membrane having pores of 20 μm in diameter to recover a coagulation. The coagulation thus recovered was immersed in a $K_3PO_4$ solution to dissolve the IHCF component of the coagulation, followed by filtration through a separation membrane having pores of 0.1 μm in diameter, and then the microplastics thus filtered was repeatedly washed using water until the pH reached neutrality. After the washing was completed, the weight of the microplastics remaining in the separation membrane was measured to calculate the amount of microplastics coagulated by Prussian blue.

FIG. 1 is a schematic diagram illustrating a process where the PAN nanoparticles were coagulated by the IHCF to form an aggregate (PANNP/IHCF), and the PANNP/IHCF was filtered by the separation membrane having pores of 20 μm in diameter.

Experimental Example 2: Microplastic Coagulation Characteristics

SEM analysis was performed on the coagulation recovered by the separation membrane having pores of 20 μm in diameter in Experimental Example 1, and SEM analysis was also performed on each of the PAN nanoparticles and the IHCF before coagulation.

Figure 2:
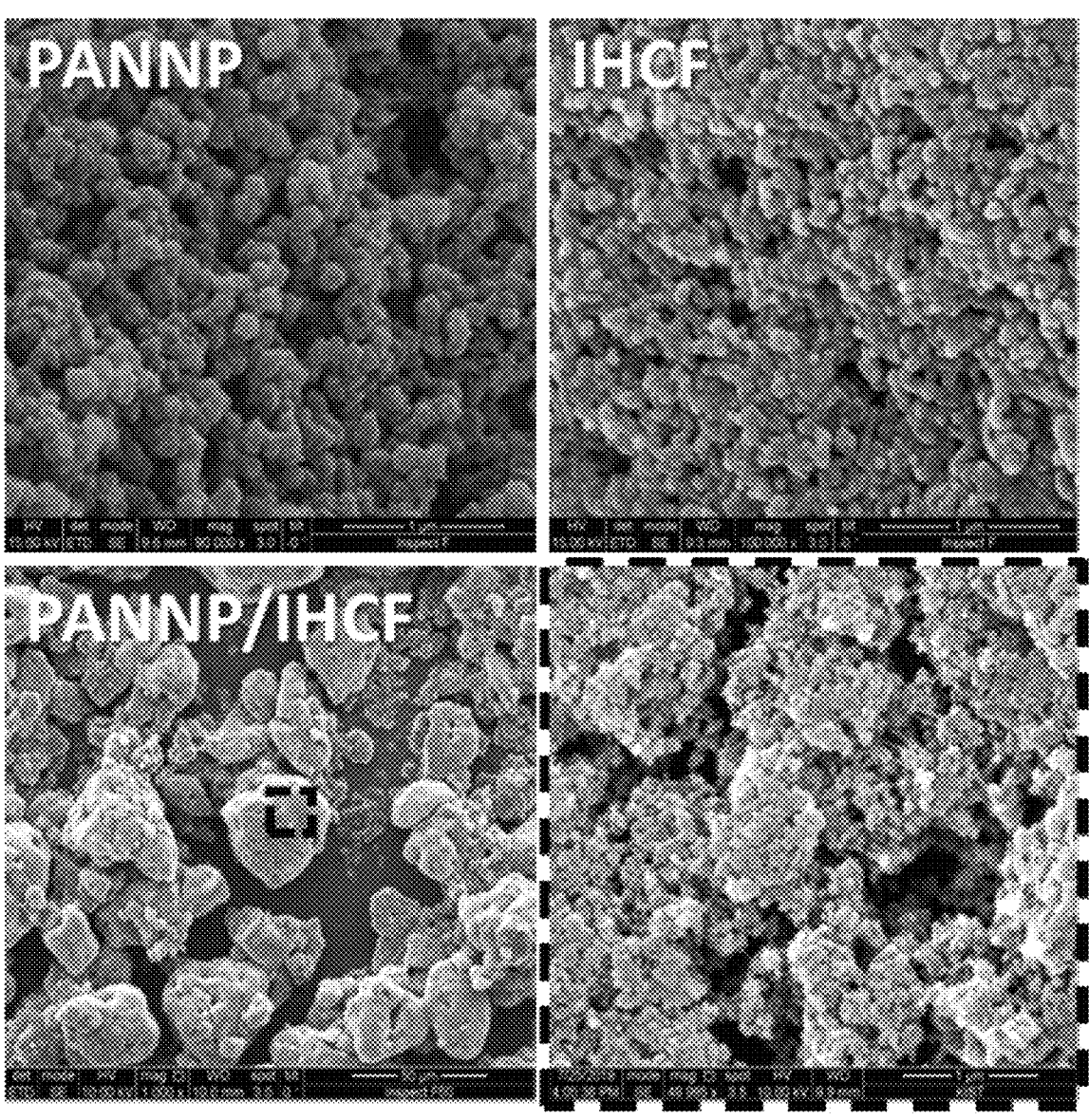
FIG. 2 is an SEM image of microplastic coagulations coagulated by Prussian blue.

Referring to FIG. 2, it could be seen that the coagulation (PANNP/IHCF) recovered by the separation membrane having pores of 20 μm in diameter had a size of 20 μm or more, and as a result of enlarging the recovered coagulation, it could be confirmed that the coagulation was the aggregate of the PAN nanoparticles and the IHCF.

Figure 3:
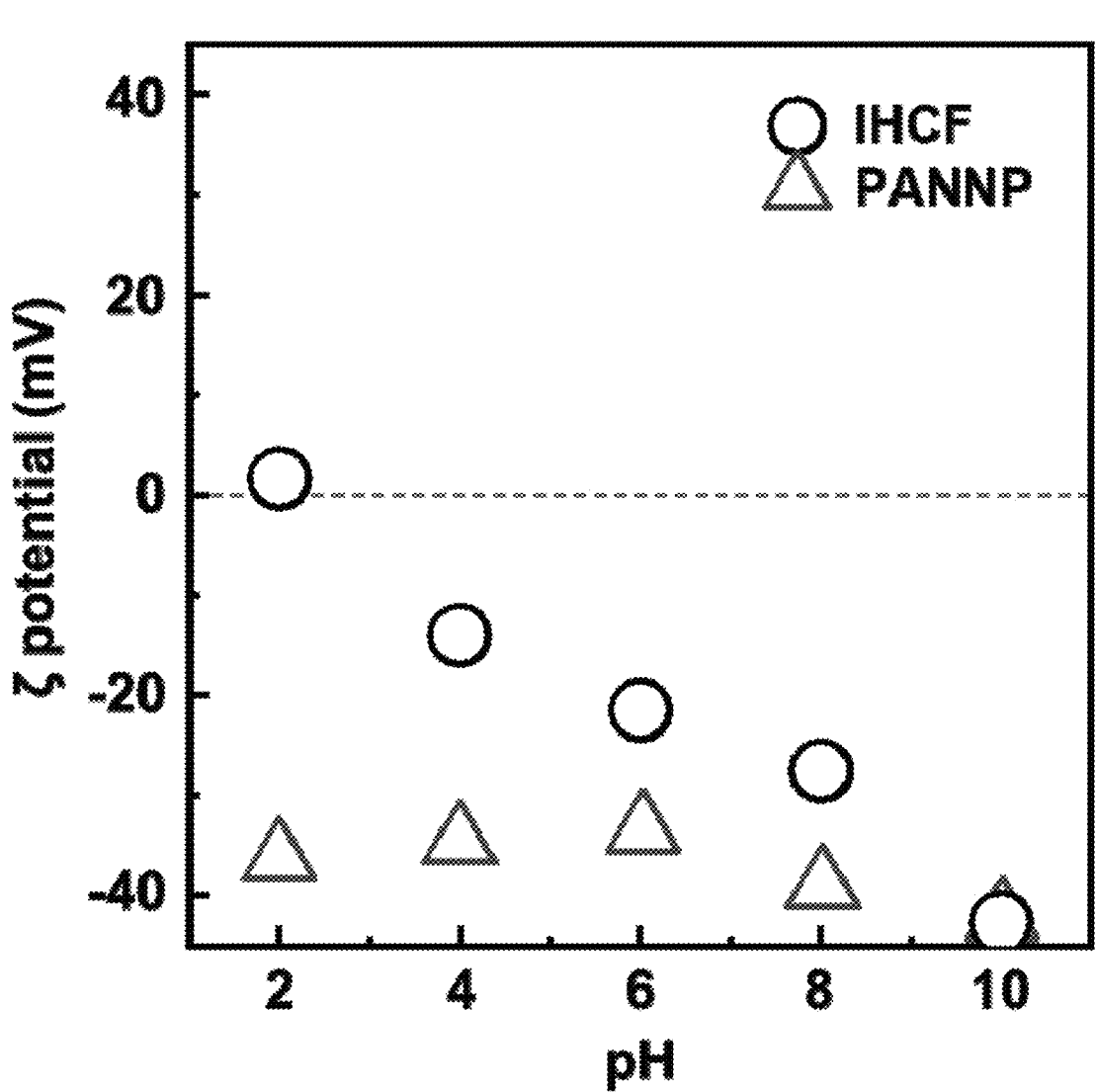
FIG. 3 is a reference diagram illustrating surface charge characteristics of Prussian blue and PAN nanoparticles according to a change in pH.

Experimental Example 3: Surface Charge Characteristics of IHCF and Microplastics in Water-System Environment As a result of examining surface charge characteristics of IHCF and microplastics in a water-system environment under various pH conditions, as shown in FIG. 3, it could be confirmed that both IHCF and microplastics were negatively charged in almost all pH ranges, and this result indicates that the mechanism of microplastic coagulation by IHCF is not due to electrical attraction.

Experimental Example 4: Microplastic Coagulation Characteristics According to Whether Visible Light is Irradiated Under the same experimental conditions as in Experimental Example 1, a microplastic coagulation experiment using IHCF was conducted in each of an environment where visible light was irradiated and an environment where visible light was not irradiated. However, unlike in Experimental Example 1, the PAN nanoparticles were input at a concentration of 200 mg/L, and the IHCF was input at a concentration of 100 mg/L.

Figure 4:
FIG. 4 is a reference diagram illustrating a microplastic coagulation states according to whether visible light is irradiated.

In FIG. 4, the sample on the left was in the environment where visible light was irradiated, and the sample on the right was in the environment where visible light was not irradiated. Referring to FIG. 4, it was confirmed that the sample on the left, which was irradiated with visible light, had a dark blue color, and a sediment of coagulated microplastics settled at the bottom of the sample, whereas the sample on the right, which was not irradiated with visible light, had a pale blue color, and no sediment settled at the bottom of the sample.

Through this result, it was presumed that in the case of the sample on the left, which was irradiated with visible light, the IHCF had a dark blue color due to IVCT characteristics of IHCF, and the IHCF with the IVCT characteristics were stabilized by bonding with the microplastics and sank to the bottom of the sample. In addition, it is determined that in the case of the sample on the right, which was not irradiated with visible light, the IVCT characteristics of IHCF were not developed, and thus, bonding with the microplastics was not carried out.

Experimental Example 5: FTIR and XRD Analysis of Microplastic Coagulations

FTIR analysis was performed on the coagulation recovered by the separation membrane having pores of 20 μm in diameter in Experimental Example 1, and FTIR analysis was also performed on each of the PAN nanoparticles and the IHCF before coagulation.

Figure 5:
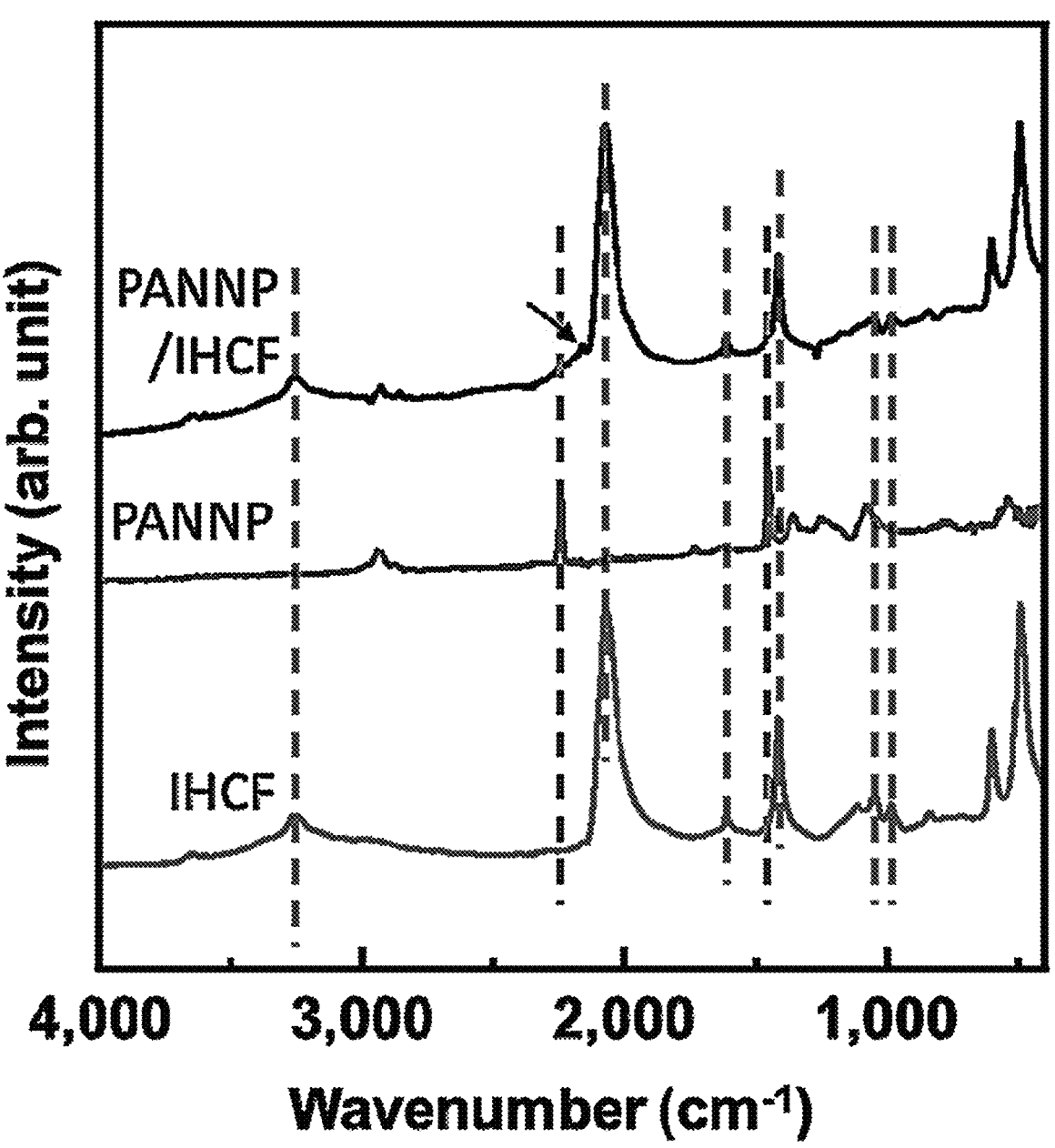
FIG. 5 is a reference diagram illustrating an FTIR analysis result according to Experimental Example 5.

As a result of performing the FTIR analysis on the coagulation (PANNP/IHCF) recovered by the separation membrane having pores of 20 μm in diameter, as shown in FIG. 5, it was confirmed that a new peak (see the pink arrow in FIG. 5) was observed compared to the PAN nanoparticles and the IHCF, indicating that the PAN nanoparticles and the IHCF were bonded by a chemical interaction rather than physical bonding.

Figure 6:
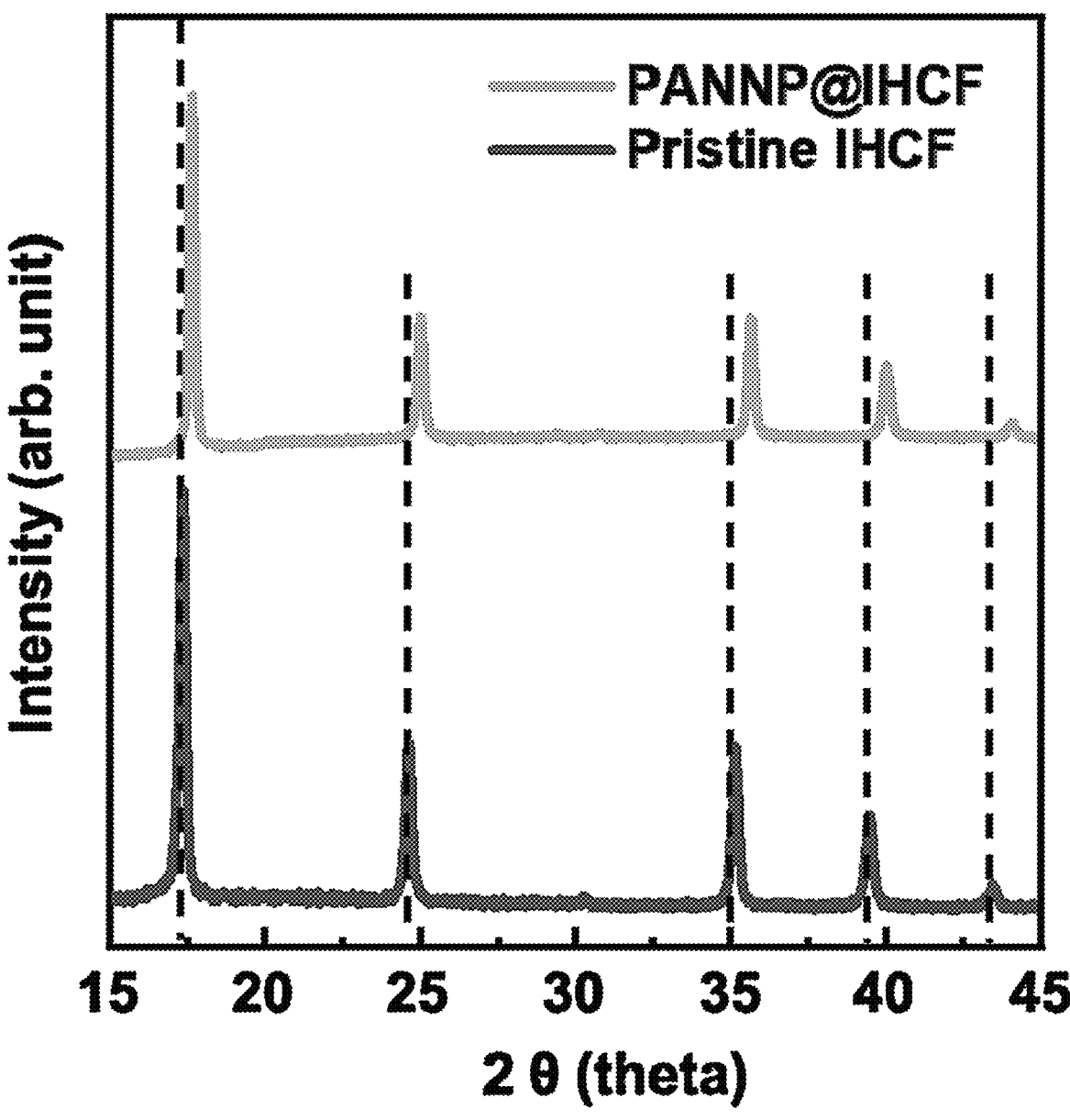
FIG. 6 is a reference diagram illustrating an XRD analysis result according to Experimental Example 5.

In addition, as a result of performing XRD analysis on the coagulation (PANNP@IHCF) recovered by the separation membrane having pores of 20 μm in diameter in Experimental Example 1 and IHCF in a water-system environment where visible light was irradiated, as shown in FIG. 6, it could be confirmed that the PANNP@IHCF was shifted to the 2θ region with a high peak, compared to the IHCF. This result indicates that the IHCF in the water-system environment where visible light was irradiated had an unstable crystalline structure, but the crystalline structure was stabilized because the IHCF was bonded with microplastics.

Experimental Example 6: Coagulation Characteristics According to Microplastic Concentration While the concentration of the IHCF as a coagulant was fixed to 200 mg/L, the concentration of the PAN nanoparticles was increased from 10 mg/L to 1,000 mg/L, and simultaneously, the amount of microplastics recovered by coagulation was measured. The experimental conditions of Experimental Example 1 were applied in the same manner, except that the concentration of the PAN nanoparticles varied.

Figure 7:
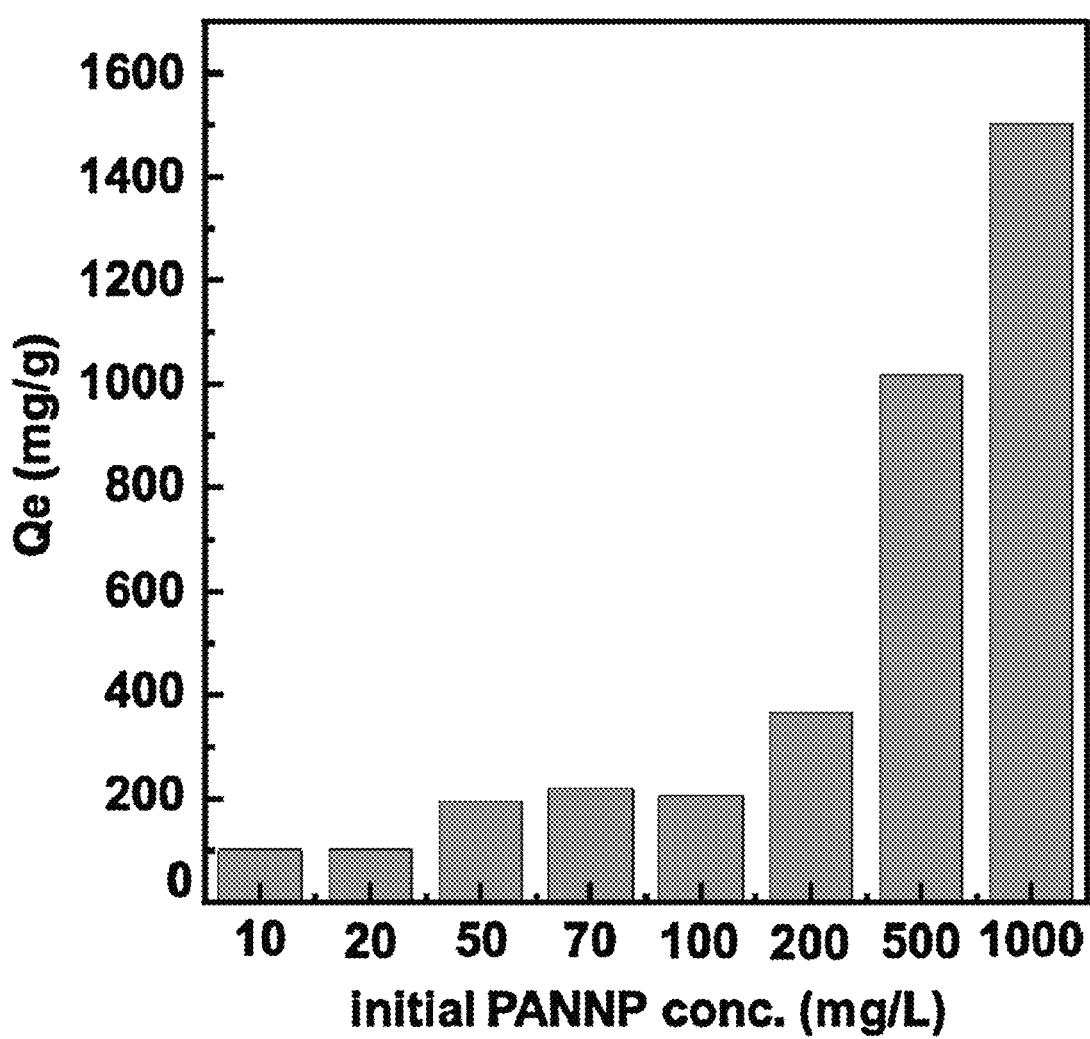
FIG. 7 is a reference diagram illustrating microplastic coagulation efficiency according to microplastic concentration.

Referring to FIG. 7, it could be seen that as the concentration of the PAN nanoparticles increased, the amount of microplastics recovered by coagulation also significantly increased, and it was confirmed that when the concentration of the PAN nanoparticles was 1,000 mg/L, the coagulation efficiency was 1502.5 mg/g. The coagulation efficiency was higher than the coagulation efficiency disclosed in Non-Patent Document 6 (Removal of microplastics and nanoplastics from urban waters: Separation and degradation, water research, 221, 118820, 2022) by a factor of at least 4.65 and not more than 237.3.

Experimental Example 7: Microplastic Coagulation Characteristics Under Presence of Cations In Experimental Example 7, an experiment was conducted to examine microplastic coagulation characteristics by IHCF in an environment where microplastics coexisted with various cations.

After 100 ppm of PAN nanoparticles was dispersed in water containing 10 mM of each of various types of cations ($Na^+$, $K^+$, $Ca^{2+}$, $Mg^{2+}$), 200 ppm of IHCF was input thereto. Next, processes for stirring the solution, recovering a coagulation, and calculating microplastics thus recovered were carried out in the same manner as in Experimental Example 1. $Na^+$, $K^+$, $Ca^{2+}$, and $Mg^{2+}$ were selected considering that they are representative cations that present in an actual water-system environment.

Figure 8:
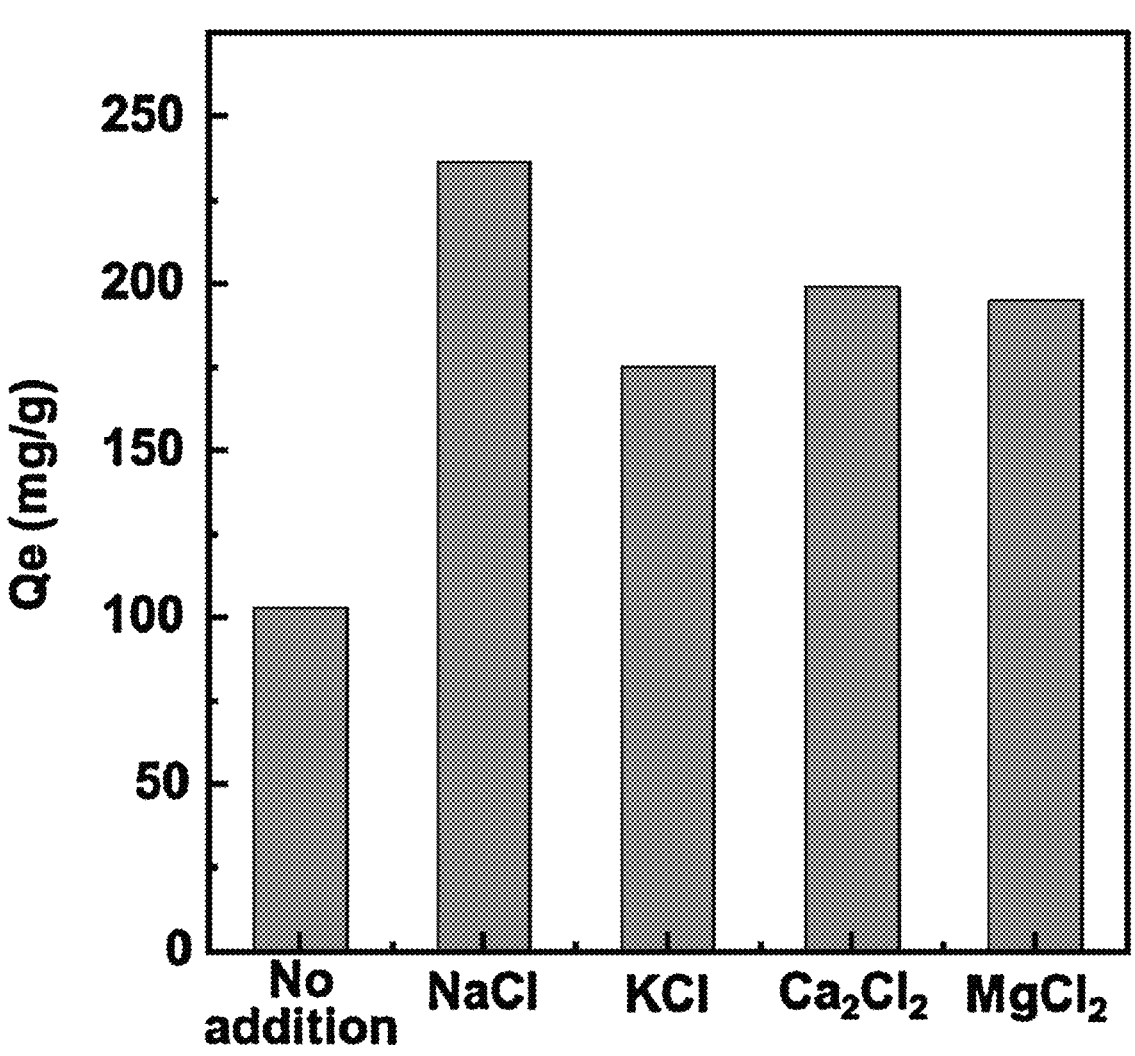
FIG. 8 is a reference diagram illustrating microplastic coagulation efficiency in an environment where cations coexist.

As a result of the experiment, as shown in FIG. 8, the coagulation efficiency in an environment where cations were not present was 205 mg/g, whereas the coagulation efficiency in an environment where $Na^+$ coexisted was 472.5 mg/g, the coagulation efficiency in an environment where $K^+$ coexisted was 350 mg/g, the coagulation efficiency in an environment where $Ca^{2+}$ coexisted was 397.5 mg/g, and the coagulation efficiency in an environment where $Mg^{2+}$ coexisted was 390 mg/g. It was confirmed that the coagulation efficiency rather increased in the environment where the cations coexisted, and according to this result, microplastic coagulation effects by Prussian blue in an actual water-system environment could be further expected.

Experimental Example 8: Microplastic Coagulation Characteristics According to pH The pH of a water-system environment varied, and microplastic coagulation characteristics at each pH were examined.

After 100 ppm of PAN nanoparticles were dispersed in each of water adjusted to pH 2, water adjusted to pH 6, and water adjusted to pH 10, 200 ppm of IHCF was input thereto. Next, processes for stirring the solution, recovering a coagulation, and calculating microplastics thus recovered were carried out in the same manner as in Experimental Example 1.

Figure 9:
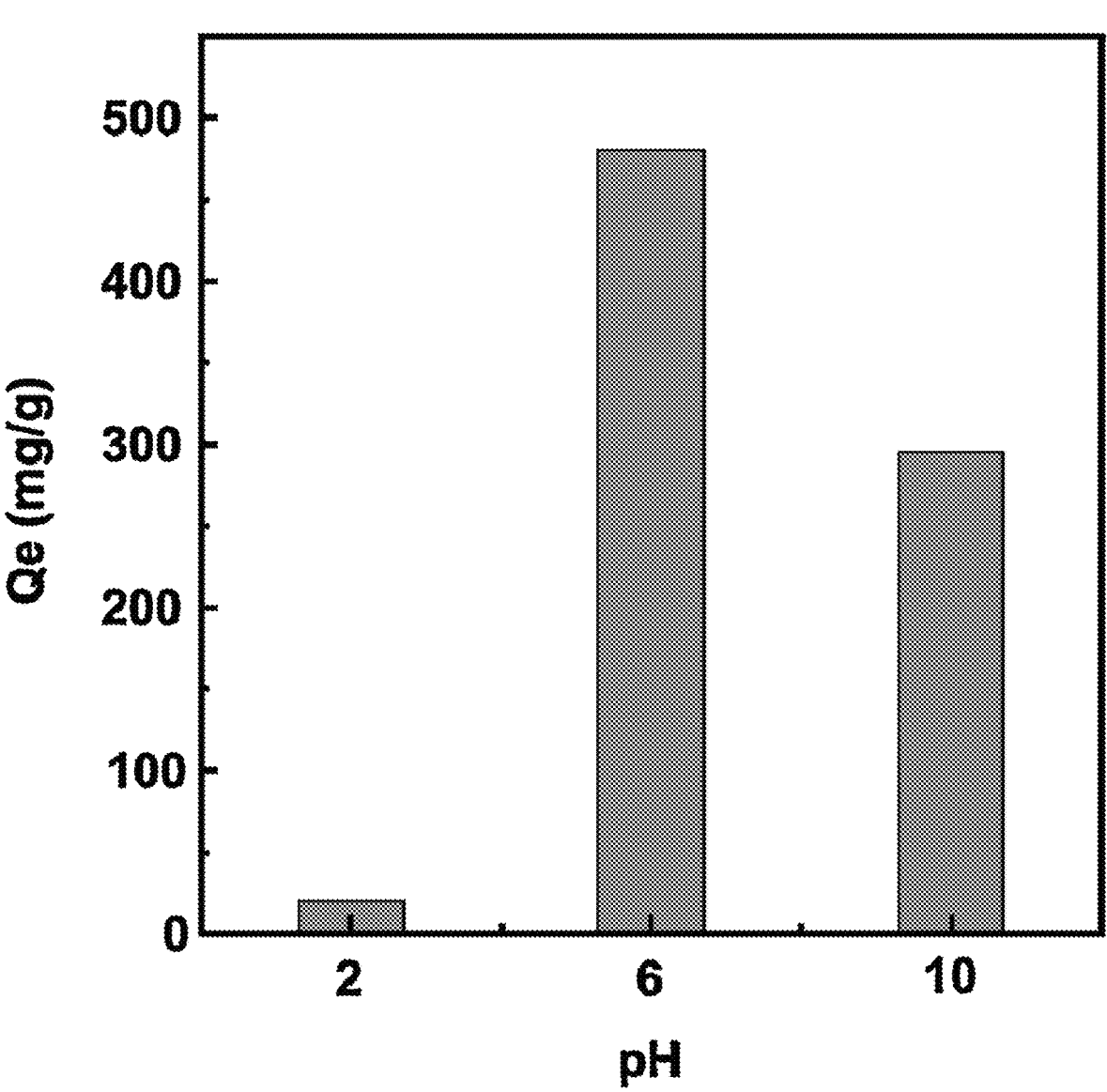
FIG. 9 is a reference diagram illustrating microplastic coagulation efficiency according to pH.

As a result of the experiment, as shown in FIG. 9, it could be seen that the coagulation efficiency was the best under the condition of pH 6, which is neutral, and the coagulation efficiency was above a certain level even at pH 10, which is alkaline. In contrast, the coagulation efficiency rapidly decreased under the condition of pH 2, which is acidic.

Experimental Example 9: Microplastic Coagulation Characteristics According to Microplastic Size After 100 ppm of polystyrene (PS) nanoparticles having a diameter of 0.1 μm and 100 ppm of PS nanoparticles having a diameter of 1 μm were respectively dispersed in different waters, 200 ppm of IHCF was input thereto. Next, processes for stirring the solution, recovering a coagulation, and calculating microplastics thus recovered were carried out in the same manner as in Experimental Example 1.

Figure 10:
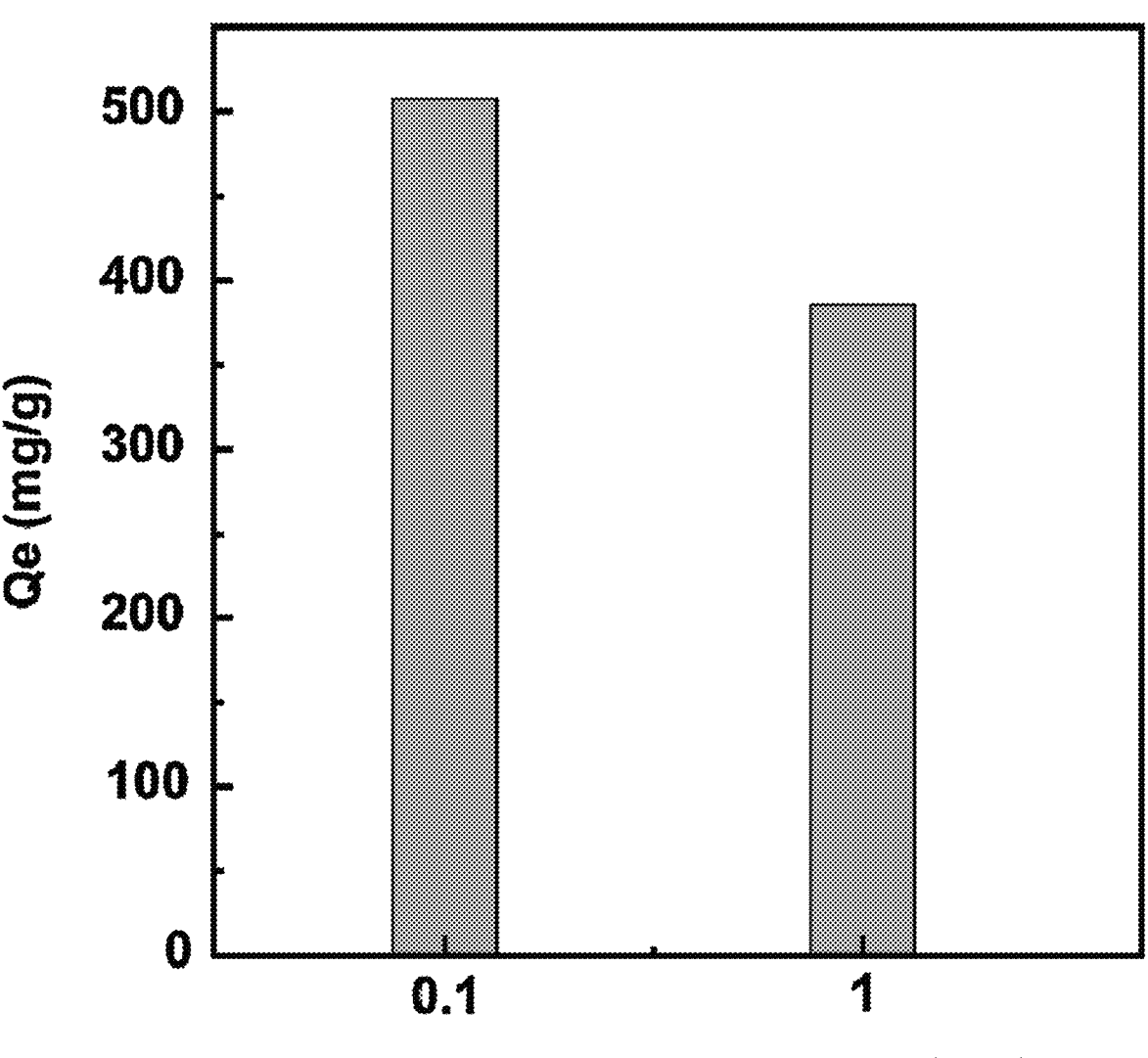
FIG. 10 is a reference diagram illustrating microplastic coagulation efficiency according to microplastic size.

As a result of the experiment, as shown in FIG. 10, in the case of the PS nanoparticles having a size of 1 μm, the coagulation efficiency was 385 mg/g, whereas in the case of the PS nanoparticles having a size of 0.1 μm, the coagulation efficiency was 500 mg/g, and all of the input PS nanoparticles were recovered. According to this result, it is presumed that the smaller the size of microplastics, the more electrochemically unstable they are, resulting in an increase in bonding force with Prussian blue.

In addition, under the same experimental conditions, the coagulation efficiency of the PAN nanoparticles was 205 mg/g, whereas the coagulation efficiency of the PS nanoparticles was 385 mg/g, and thus, it was confirmed that the coagulation efficiency of the PS nanoparticles were relatively excellent.

Figure 11:
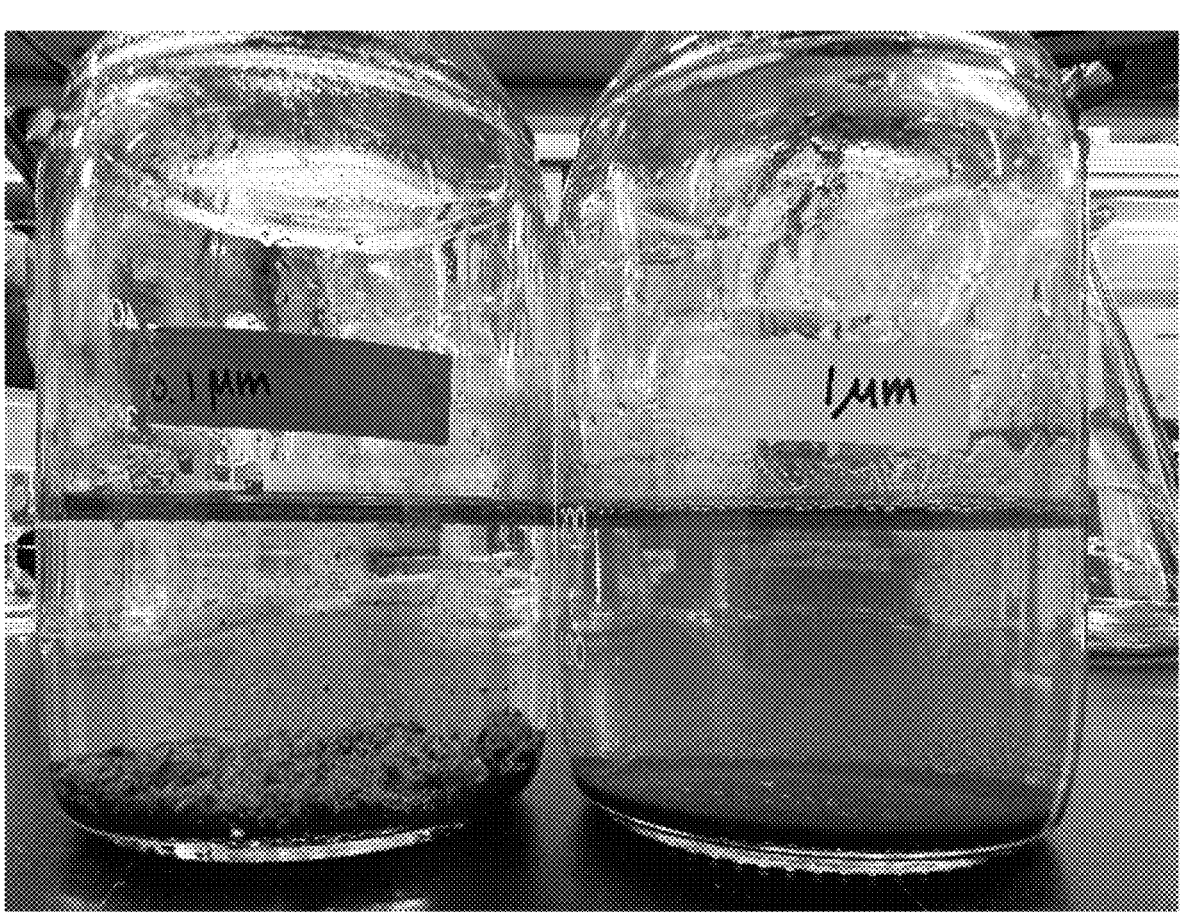
FIG. 11 is a reference diagram illustrating a microplastic coagulation state according to microplastic size.

FIG. 11 is a photograph of the samples according to Experimental Example 9, and even with the naked eye, it may be confirmed that the coagulation efficiency of the PS nanoparticles having a size of 0.1 μm is superior to that of PS nanoparticles having a size of 1 μm.

What is claimed is:

1. A microplastic coagulation method comprising:
 placing a Prussian blue-based coagulant in a water-system environment with microplastics present in the water-system environment; and
 coagulating the microplastics by using the Prussian blue-based coagulant under visible-light irradiation,
 wherein the Prussian blue-based coagulant comprises Prussian blue or a Prussian blue analogue.

2. The microplastic coagulation method according to claim 1, wherein a chemical formula of the Prussian blue analogue is $Me^1Me^2(CN_6)$, and
 wherein $Me^1$ and $Me^2$ are different transition metals.

3. The microplastic coagulation method according to claim 2, wherein a pH of the water-system environment where the microplastics are present is neutral or alkaline.

4. The microplastic coagulation method according to claim 1, wherein a pH of the water-system environment where the microplastics are present is neutral or alkaline.

* * * * *